Feb. 4, 1930.    J. ZOLKOWSKY    1,745,393
SNAP HOOK FOR AUTOMOBILE TIRE CHAINS
Filed March 23, 1929
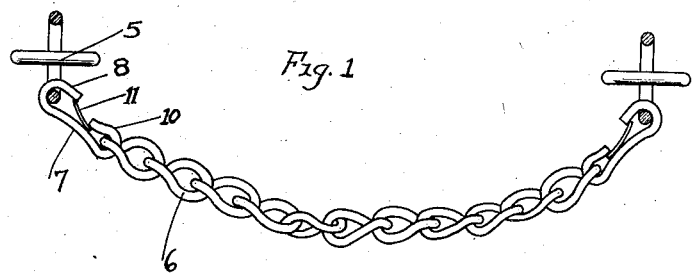
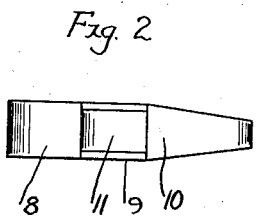
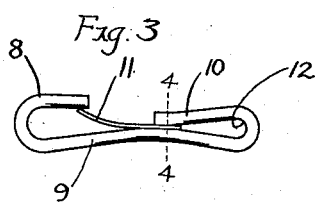
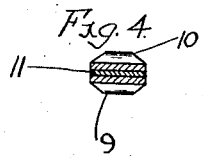
INVENTOR.
J. Zolkowsky.
ATTORNEYS.

Patented Feb. 4, 1930

1,745,393

UNITED STATES PATENT OFFICE

JOSEPH ZOLKOWSKY, OF MENASHA, WISCONSIN

SNAP HOOK FOR AUTOMOBILE TIRE CHAINS

Application filed March 23, 1929. Serial No. 349,408.

The present invention relates to tire chains and more particularly to a fastener for the transverse chain sections providing means for attaching the same to the chain sections which are usually disposed circumferentially at the sides of the tire.

An object of the invention is to provide a fastener enabling the transverse chain sections to be easily secured in position and thus enable the same to be conveniently replaced should the same become broken.

A still further object is to provide a fastener which embodies simplicity of construction, which is strong and durable, relatively inexpensive to manufacture and otherwise well adapted for the purposes for which the same is intended.

Other objects and advantages reside in the special construction, combination and arrangement of the various elements forming the invention, as more fully hereinafter described and claimed, reference being had to the accompanying drawing forming part hereof, wherein like numerals refer to like parts throughout the specification and in which Figure 1 is a transverse sectional view through the side chains showing the transverse chain sections secured thereto, Figure 2 is a plan view of one of the fasteners, Figure 3 is a side elevational view thereof, and Figure 4 is a sectional view through the fastener taken along a line 4—4 of Figure 3.

Referring now to the drawing in detail, for the purpose of illustration I have shown my invention employed in operative relation with a conventional type of automobile tire chain and which includes a pair of side chains 5 to which the ends of transverse chain sections 6 are attached for extending across the tread of the automobile tire in a manner well known in the art.

Each end of the transverse chain sections are provided with snap fasteners indicated generally at 7 which are constructed of bendable metal having its opposite ends bent inwardly toward each other and with one of the ends designated at 8 terminating in spaced relation from the intermediate section 9 of the fastener substantially in the form of a hook. The other end shown at 10 has its extremity bent downwardly upon the intermediate section 9 for securing one end of a leaf spring 11 therebetween. The end of the fastener 10 is pressed downwardly tightly against the end of the spring 11 to firmly wedge the spring between the end of the material and the intermediate section 9 of the fastener. The other end of the spring 11 is curved upwardly and engages the under edge of the hook 8, the spring serving to thus close the opening of the hook. The downwardly pressed end 10 of the fastener serves to form a loop indicated at 12 at the end of the fastener opposite from the hook end 8 within which the end chain link of the transverse chain section 6 is secured, the hook end 8 of the fastener being adapted to be snapped over one of the links of the side chain section 5 in a manner clearly illustrated in Figure 1 of the drawing.

The material from which the fastener is constructed is preferably in the form of strap metal, as more clearly illustrated in Figure 2 so that a substantially wide gripping surface is provided for one end of the spring between the portions of the fastener, as clearly shown in Figure 4.

It is obvious that the invention is susceptible of various changes and modifications without departing from the spirit thereof or the scope of the appended claim, and I accordingly claim as my own all such forms of the invention to which I am entitled.

I claim:

A chain fastener of the class described comprising an elongated metallic member having its opposite ends bent inwardly and terminating in spaced relation from each other with one of its bent ends disposed in spaced relation from the intermediate portion of the member to form a hook and with the other of its bent ends closed against the intermediate portion of the member whereby to form a loop at one end of the member for receiving a chain link and a spring leaf interposed between said closed end of the member and the intermediate portion thereof and frictionally held therebetween, said spring member having its opposite end bent outwardly and extended beneath the end of the hook for yieldably closing the same.

In testimony whereof I affix my signature.

JOSEPH ZOLKOWSKY.